United States Patent [19]

Frey, Jr.

[11] Patent Number: 5,083,229
[45] Date of Patent: Jan. 21, 1992

[54] DISK DRIVE WITH MINIMIZED HEAD-ARM EXCURSIONS

[75] Inventor: Alexander H. Frey, Jr., Pasadena, Calif.

[73] Assignee: International Business Machines Corporation, Armonk, N.Y.

[21] Appl. No.: 509,860

[22] Filed: Apr. 16, 1990

[51] Int. Cl.⁵ .......................... G11B 21/08; G11B 5/55
[52] U.S. Cl. .................................. 360/78.04; 360/75; 369/32
[58] Field of Search .................. 360/75, 78.04, 78.08, 360/69, 55, 61, 62; 369/14, 15, 32

[56] References Cited

U.S. PATENT DOCUMENTS

| | | |
|---|---|---|
| 4,434,487 | 2/1984 | Rubinson et al. . |
| 4,545,043 | 10/1985 | Anderson et al. ............. 369/32 |
| 4,722,085 | 1/1988 | Flora et al. . |
| 4,817,035 | 3/1989 | Timsit . |
| 4,819,153 | 4/1989 | Graham et al. . |
| 4,860,194 | 8/1989 | Harrison et al. . |

Primary Examiner—Aristotelis Psitos
Assistant Examiner—Steven R. Garland
Attorney, Agent, or Firm—Perman & Green

[57] ABSTRACT

The method of the invention is performed on a disk drive with at least a rotatable disk and a head/arm mechanism movable thereover. The disk has a plurality of concentric tracks, including innermost and outermost tracks and an intermediate track positioned therebetween, with the intermediate track including often-used records. The method reduces movements of the head/arm mechanism through the steps of: positioning the head/arm mechanism over the intermediate track; moving the head/arm mechanism away from the intermediate track to another track to perform a requested read operation; moving the head/arm mechanism back to the intermediate track from the further track and performing write actions in the tracks over which the head/arm mechanism moves in its traversal back to the intermediate track.

9 Claims, 3 Drawing Sheets

DISK DRIVE WITH MINIMIZED HEAD-ARM EXCURSIONS

FIELD OF THE INVENTION

This invention relates to disk drive memories and more particularly, to a method for maintaining a minimum of head/arm movements over the disk surface.

BACKGROUND OF THE INVENTION

Conventionally, read and write commands to disk are performed immediately upon issuance of the command. Read commands generally must be performed immediately to assure smooth operation of a program. However, write commands, which occur when modified data is to be rewritten to disk, need not necessarily be performed immediately. Nevertheless, such writes to disk have been conventionally performed on an "as occur" basis. As a result, a number of head/arm movements over the disk surface occur which require substantial travel to accomplish the various write commands.

By their nature, such extended head/arm traversals over the disk surface consume time, during which, the disk is rendered unable to respond to a read command. When this occurs, program execution waits until the requested data is read.

In this invention a temporary file is provided for the storage of modified data and further provides a buffering arrangement for data which is to be rewritten to disk. Because the modified data is stored in the temporary file, there is no immediate need to rewrite it to its final position on disk. Thus the accepted procedure of writing on an "as occur" basis is unnecessary.

As the temporary file is employed during substantially every "write" operation, it is desireable to station the disk drive's read/write head directly over the track (or tracks) in which the temporary file is stored. Furthermore, the temporary file track is generally placed midway between the innermost an outermost disk tracks so that head movements to other tracks can be minimized.

Accordingly, it is an object of this invention to provide a disk drive system wherein the head/arm structure is positioned over an often-used track and head/arm write excursions are minimized.

It is another object of this invention to provide a method for minimizing head/arm excursions by performing a plurality of write actions in a single head/arm excursion.

SUMMARY OF THE INVENTION

The method of the invention is performed on a disk drive with at least a rotatable disk and a head/arm mechanism movable moreover. The disk has a plurality of concentric tracks, including innermost and outermost tracks and an intermediate track positioned therebetween, with the intermediate track including often-used records. The method reduces movements of the head/arm mechanism through the steps of:

a. positioning the head/arm mechanism over the intermediate track;
b. moving the head/arm mechanism away from the intermediate track to another track to perform a requested read operation;
c. moving the head/arm mechanism, after the read operation, further away from the intermediate track by a determined distance to a further track;
d. moving the head/arm mechanism back to the intermediate track from the further track and performing write actions in tracks over which the head/arm mechanism moves in its traversal back to the intermediate track. The position of the further track may be determined dependent upon the rate of read requests recently experienced by the disk drive.

DETAILED DESCRIPTION OF THE INVENTION

Figure 1:
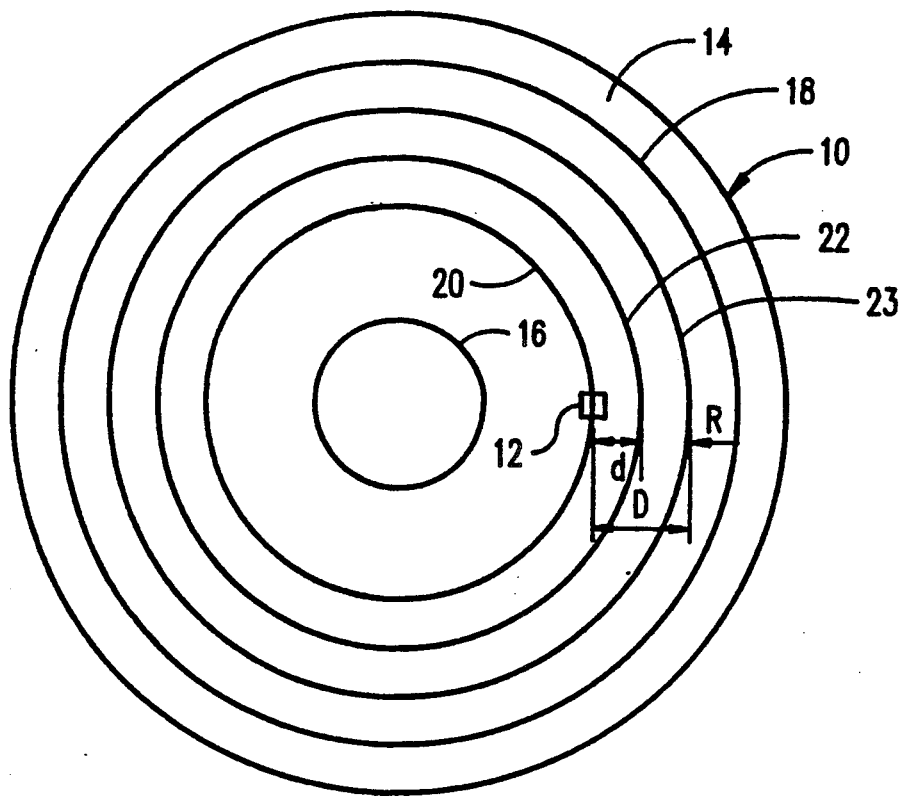
FIG. 1 is plan view of a disk surface showing various track positions thereon.

Referring now to FIG. 1, a schematic view of a magnetic disk 10 is illustrated over which read/write head 12 is positioned. Disk surface 14, in the well known manner, comprises a plurality of discrete recording tracks with track 16 being an innermost recording track and track 18 an outermost track. Track 20 is an intermediate track and is generally placed approximately midway between tracks 16 and 18. Track 20 will generally include the most-used data on the disk surface. In particular, it will contain the aforementioned temporary file.

The temporary file includes copies of both unmodified and modified data for the purpose of enabling recovery of the computing system in the event of a failure. Notwithstanding the fact that track 20 is most-often used, read/write head 12 must be moved about the surface 14 of disk 10 to accomplish read and write functions on other tracks.

In general, a read command is immediately executed, with head 12 being immediately moved to the track in which the requested data is positioned. For instance, assuming that track 22 contains data which is to be read, the arm structure (not shown) attached to head 12 causes head 12 to traverse the distance d to track 22 (i.e., "read" track) where the requested data is then read. In the prior art, head 12 would then be moved to another track to either perform a write or read function depending upon which command is pending and in the sequence that they were requested. In this instance however, the temporary file enables a number of modified records to be queued in a buffer, awaiting their time to be rewritten to disk.

It has been found preferable to accomplish some of these rewrites during a portion of a head excursion in connection with a read operation. Furthermore, it has been found preferable, after the read operation, to move head 12 a little further away from intermediate track 20 by a determined distance and then to cause the writes to occur as head 12 is moved back from there to track 20. This enables the write queue to be reduced during each read excursion of head 12. On the other hand, it is preferable to the functioning of a parallel computing system that read commands are immediately executed upon receipt. Thus, if read commands are being received on a rapid basis, the movement of head 12 to perform the queued write functions will be preempted to avoid significant delay of the operation of the system.

To further minimize head-arm excursions, head 12 may be incrementally moved past the "read" track (track 22) by a determined amount to accomplish the nearby write functions on its return excursion. However, that determined amount may be made directly dependent upon the number of read commands recently received. To implement this function, a "write time" of duration T is assigned and is the period of time for performing writes to disk. The rate of read commands is also accumulated on a continuing basis, with the rate "r" being the number of read commands per time T. A radial overshoot R of head 12 past a "read" track is calculated from the function:

$$R = \left(1 + \frac{1}{r}\right)$$

It can thus be seen that radial overshoot R varies inversely the number of read commands experienced during time T. As the number of read commands increases, R decreases. In other words, it is known that the average minimum time for read operations by head 12 can be accomplished by maintaining head 12 approximately centrally located between the innermost and outermost tracks 16 and 22. This, of course, disregards any write requirements of the system. Thus, as the rate of read commands increase, it is less desirable that head 12 be moved further away from intermediate track 20 to prevent the required read commands from efficiently being executed. The distance D of the further excursion of head 12 from track 20 is given by the relation:

$$D = R(d).$$

Thus, in summary, head 12 is moved to a read track 22 to accomplish a read function. Then, assuming a queue of modified data awaits to be rewritten to disk, head 12 is moved further to a track (e.g. track 23) which is a distance D from intermediate track 20. At this point, head 12 is then moved back towards track 20 and the writes to be accomplished within the tracks encompassed by distance D are performed along the way.

Figure 2:
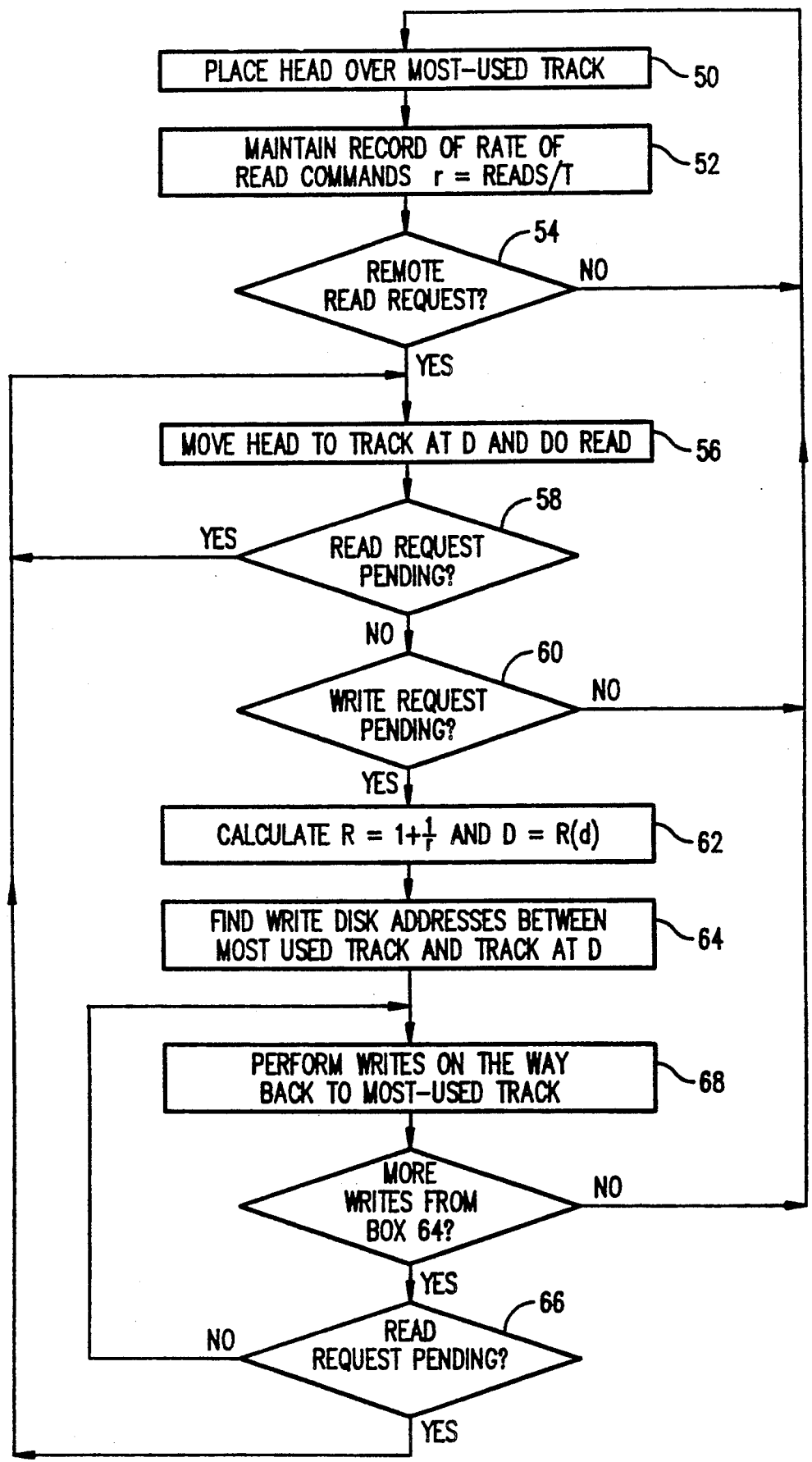
FIG. 2 is a high level flow diagram of the method of the invention.

Referring now to FIG. 2, a more detailed flow diagram of the method of the invention is described. Initially, head 12 is positioned over a most-used track, e.g., track 20 (box 50). The system then maintains a record of the rate of read commands experienced during time T (box 52). If there is no read request pending (box 54) for a track remote from track 20, the program recycles to box 50. If there is a remote read request pending, the system moves head 12 to the read track (e.g., track 22), and the read is accomplished (box 56). The system then inquires as to whether there is another read request pending (box 58) and if so, it performs the requested read. If there is no read request pending, it inquires into whether there is a write request (or requests) pending (box 60). If no, the head is moved back over the most used track (box 50). If write requests are pending, the system calculates R and D (box 62) and finds those disk addresses for records to be rewritten between the most used track and the track (e.g. track 23) at distance D therefrom, (in the direction of the read track). Again, as before, if a read request is pending, (box 66), it takes precedence and is immediately performed. If there is no read request pending, head 12 is moved to track 23 where the data queued to be written is then recorded in the tracks over which head 12 traverses on its way back to track 20 (box 68). The program then recycles and continues as above stated.

Figure 3:
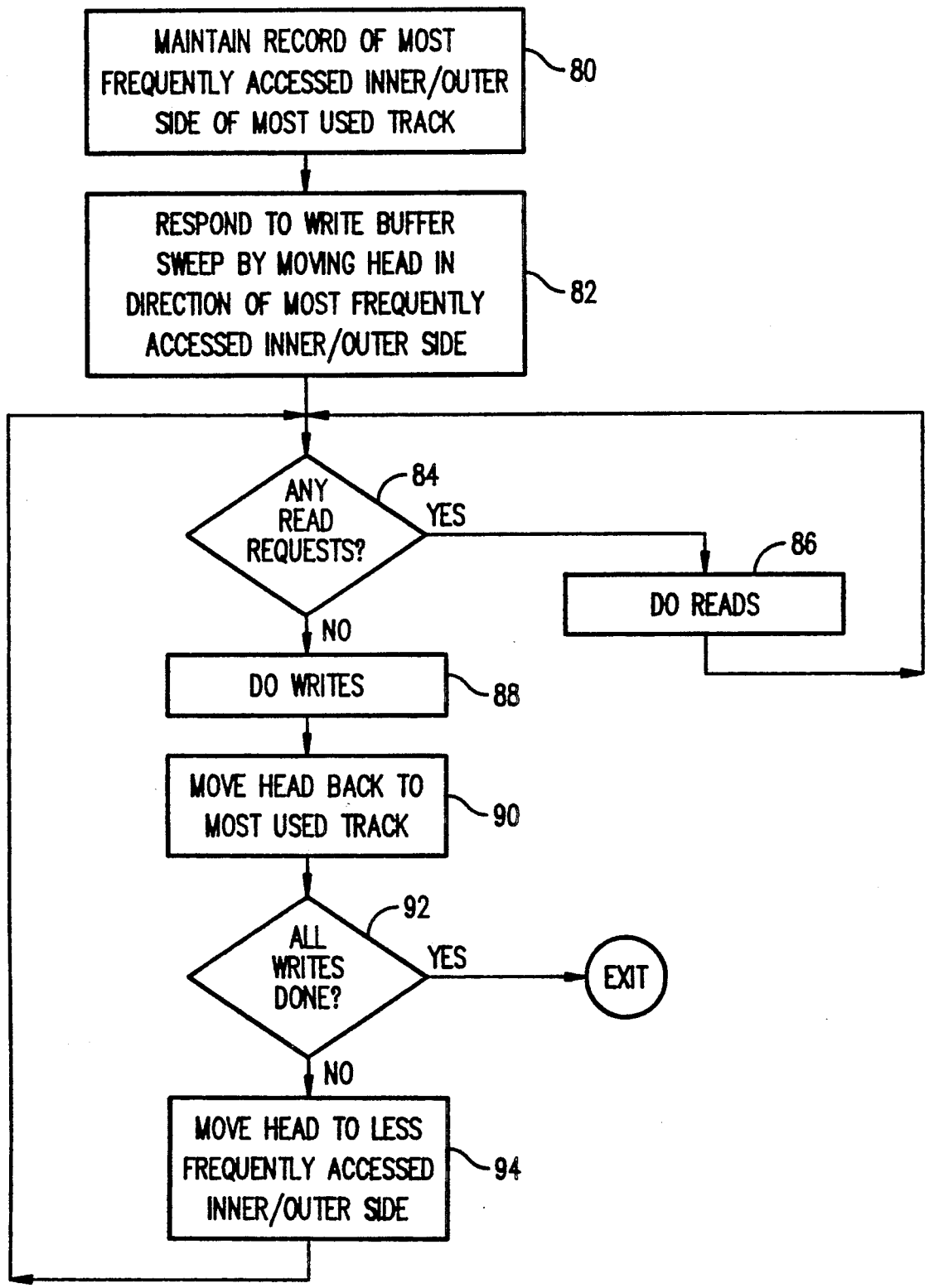
FIG. 3 is a high level flow diagram of the invention's method when it is applied to a "disk sweep" operation.

Under certain circumstances, it may occur that too many data records to be rewritten have been accumulated in a write buffer. In such case, a "disk-sweep" function is performed to "clean out" to-be-written data queue. This method is shown in the flow diagram of FIG. 3. Preparatory to carrying out this method, the system maintains a record of whether the inner or the outer sides of the most-used track, is most frequently accessed (box 80).

In response to a "disk-sweep" command, the system then moves head 12 in the direction of the most frequently accessed inner or outer side of disk 10 (box 82). Here again, if any read requests are pending (box 84), they are immediately performed (box 86) and the system recycles. If there are no read requests pending, the queued writes are performed (box 88) as head 12 is moved back to the most used track (box 90). The system then inquires whether all writes are complete (box 92) and if the answer is no, it then moves head 12 to the less frequently accessed inner/outer side of disk 10 and does the writes queued for that portion of the disk surface (box 94), (recalling that any read request will immediately cause an interrupt to occur and the read to be performed). Once all writes have been accomplished, the program exits.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. In a disk drive means with at least a rotatable disk and a head-arm mechanism movable thereover, said disk having a plurality of concentric tracks including innermost and outermost tracks and an intermediate track positioned therebetween, said intermediate track including often-used records, a method for reducing movements of said head-arm mechanism comprising the steps of:
   a. positioning said head-arm mechanism over said intermediate track;
   b. moving said head-arm mechanism away from said intermediate track to another track to perform a requested read operation; and
   c. moving said head-arm mechanism back to said intermediate track and performing write actions in tracks over which said head moves in its movement back to said intermediate track.

2. The method of claim 1 wherein said disk drive means accumulates, in a buffer area, data to be written, which data is accessed during step c.

3. The method of claim 2, wherein subsequent to step (b) but prior to step (c), the method further comprises the step of:
   b1. moving said head-arm mechanism further away from said intermediate track by a determined distance to another track.

4. The method of claim 3 wherein said determined distance is dependent upon a rate of experienced read requests.

5. The method of claim 4 wherein said determined distance decreases as the rate of read requests increases.

6. The method of claim 4 wherein said steps b1 and c are superseded by a received read request, which request is performed as received.

7. The method of claim 6 wherein said determined distance is calculated by the formula $D = R(d)$, where:
- d = radial distance between said intermediate track and said another track
- T = system write time
- r = expected number of read commands during T, and
- R = Radial Overshoot = $1 + 1/r$.

8. In a disk drive means with at least a rotatable disk and a head movable thereover, said disk having a plurality of concentric tracks including innermost and outermost tracks and an intermediate track positioned therebetween, said intermediate track including often-used records, said disk means accumulating, in a buffer area, data to be written to disk, the method for writing such data comprising the steps of:

a. generating a command to write to disk said accumulated data in said buffer area;

b. determining whether the tracks between said intermediate track and said innermost track or between said intermediate track and said outermost track, are most often accessed;

c. moving said head across said innermost or outermost tracks in dependence upon which tracks are determined to be most often accessed; and d. writing data from said buffer area to disk during said movement in step c.

9. The method of claim 8 further comprising the steps of moving the head to the intermediate track;

e. moving said head in the opposite direction to that of step c, after said head has been moved back to said intermediate track; and f. writing data from said buffer area to disk during said movement in step e.

* * * * *